United States Patent [19]

Williams

[11] 4,419,050

[45] Dec. 6, 1983

[54] METHOD AND APPARATUS FOR CONTROLLING PROPELLER PITCH

[76] Inventor: Charles L. Williams, 6 Rowe Ave., Rockport, Mass. 01966

[21] Appl. No.: 179,047

[22] Filed: Aug. 18, 1980

[51] Int. Cl.³ .............................................. F01D 7/02
[52] U.S. Cl. ..................................... 416/46; 416/154; 416/157 R; 416/220 R
[58] Field of Search ................. 416/48, 136, 137, 154, 416/157 R, 46, 45, 51 A, 52 R, 51 R, 206, 204 R, 214 R, 219 R, 220 R

[56] References Cited

U.S. PATENT DOCUMENTS

| | | | |
|---|---|---|---|
| 2,694,459 | 11/1954 | Biermann | 416/46 |
| 2,911,050 | 11/1956 | Scott | 416/48 |
| 3,115,939 | 12/1963 | Berninger | 416/45 |
| 3,799,699 | 3/1974 | Master | 416/206 |

FOREIGN PATENT DOCUMENTS 951709  10/1956  Fed. Rep. of Germany ...... 416/137

Primary Examiner—Harvey C. Hornsby
Assistant Examiner—John T. Kwon
Attorney, Agent, or Firm—E. Thorpe Barrett

[57] ABSTRACT

A variable pitch propeller is controlled by a hydraulic mechanism responsive to forces urging an unsymmetrically mounted propeller towards its maximum pitch. Spring bias means maintains the propeller at minimum pitch under conditions of rest. The propeller is prevented from increasing its pitch by the pressure produced on a closed hydraulic chamber until it reaches a predetermined r.p.m., when a centrifugal valve opens a first port and relieves the pressure in the cylinder and allows the propeller to increase in pitch. The increase in pitch opens a second port communicating with the pressure chamber, but that channel remains closed by a second valve that is normally closed but opens in response to a reduction in the throttle setting. The reduction in throttle setting closes the centrifugal valve so that the only channel from the pressure chamber is through the second port. When the second port is opened by the action of the reduced throttle, which reduces the forces generated on the control system by the propeller, the pitch immediately increases and in turn closes the second port and locks the propeller in the higher pitch position. The propeller is supported for rotation about its radial axis by two pairs of radially-aligned V-blocks and pivot blocks that provides a low-friction, sturdy mount.

4 Claims, 9 Drawing Figures

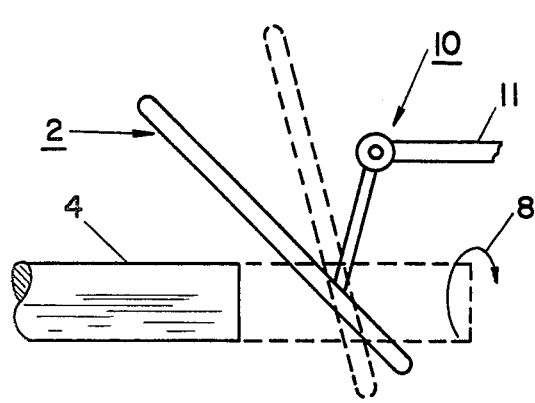
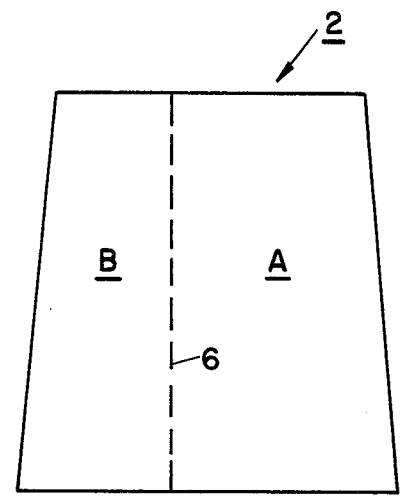
FIGURE 1
FIGURE 2
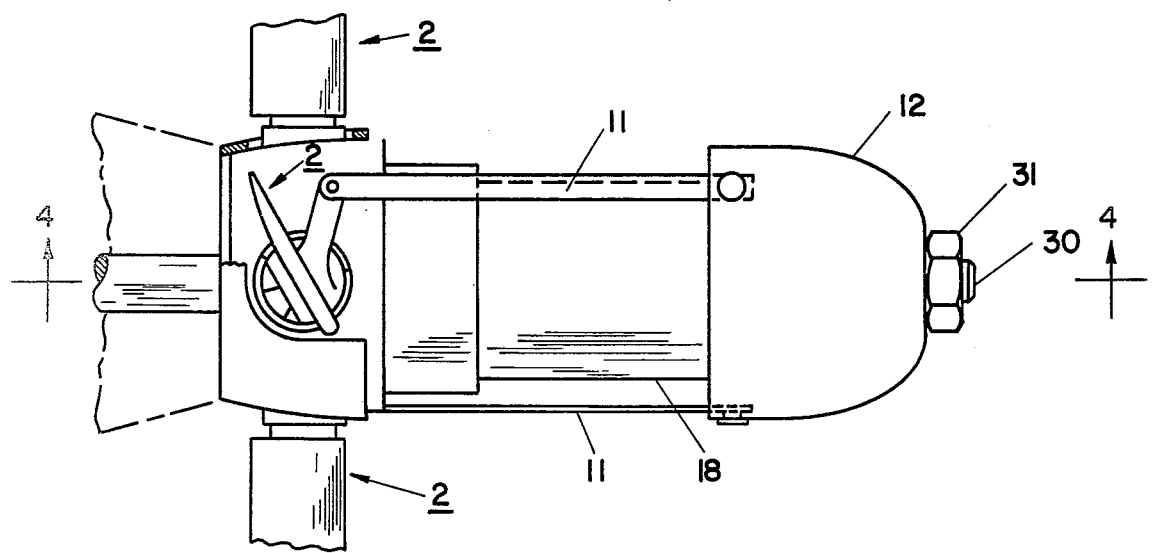
FIGURE 3

METHOD AND APPARATUS FOR CONTROLLING PROPELLER PITCH

BACKGROUND OF THE INVENTION

1. Field of the Invention

This invention relates to a control mechanism and method for varying the pitch of a propeller in a fluid medium, such as propellers for use on pumps, boats and aircraft. The variable pitch characteristic also finds utility in mechanisms where the propeller is driven by movement of the fluid medium in which it is immersed. More particularly this invention relates to a hydraulic mechanism for controlling the pitch and to an improved mounting for a variable pitch propeller blade.

2. Description of the Prior Art

There are a number of reasons why it is desirable to vary the pitch of such a propeller. One reason is to permit matching the load imposed by the propeller with the speed-torque characteristics of the drive engine. Another desirable objective is rapid acceleration of the vehicle engine without overloading it. Another advantage of pitch control is to achieve maximum economy under stable state conditions. Most variable pitch propellers, such as those used on aircraft and larger boats, are controlled by a mechanism arranged to respond to external signals either from an automatic or manual control system. Generally, such mechanisms are expensive and are not suitable for applications where low cost and automatic operation are requirements.

Although variable pitch propellers have been available for larger boats and for installations justifying expensive and complicated control systems, practical variable pitch propellers have not been available for small boats and for other installations requiring a low-cost simple pitch-control mechanism. The present invention provides such a simple and low-cost system.

SUMMARY OF THE INVENTION

The present invention provides a low cost propeller pitch control system particularly advantageous for use on small boats. In the embodiment described here, an automatic hydraulic control system responds to propeller revolutions per minute (r.p.m.) and, under different conditions, to a change in throttle adjustment. Under starting conditions, the propeller adjusts to minimum pitch. When the propeller reaches a pre-determined r.p.m., the pitch is automatically increased. After this pitch change, and the boat has reached a speed greater than a preset minimum, the operator can, by backing off the throttle, cause a deceleration of the propeller r.p.m. and in response the control mechanism will automatically further increase the pitch and lock it in that position when the throttle setting is again increased. This process can be repeated as necessary to attain the desired operating condition. The pitch, for example, can be selected to provide maximum economy at the cruising speed. The only external control required is this change in throttle position. If it is desired to reduce the pitch, either because of an inadvertent overload of the engine or for other reason, this can be accomplished by more severely reducing the throttle for a period long enough to permit the propeller to retain automatically to minimum pitch. Each variable pitch blade is supported by a V-block hinge that provides a low-friction swivel.

BRIEF DESCRIPTION OF THE DRAWINGS

FIG. 1 is a diagrammatic representation of a variable pitch propeller blade and control arm;

FIG. 2 is a diagrammatic elevational view of the blade illustrating the off-center mounting that causes the blade to automatically seek its position of maximum pitch;

FIG. 3 is a side view of a propeller control mechanism embodying the invention;

DESCRIPTION OF THE PREFERRED EMBODIMENT

Figure 4:
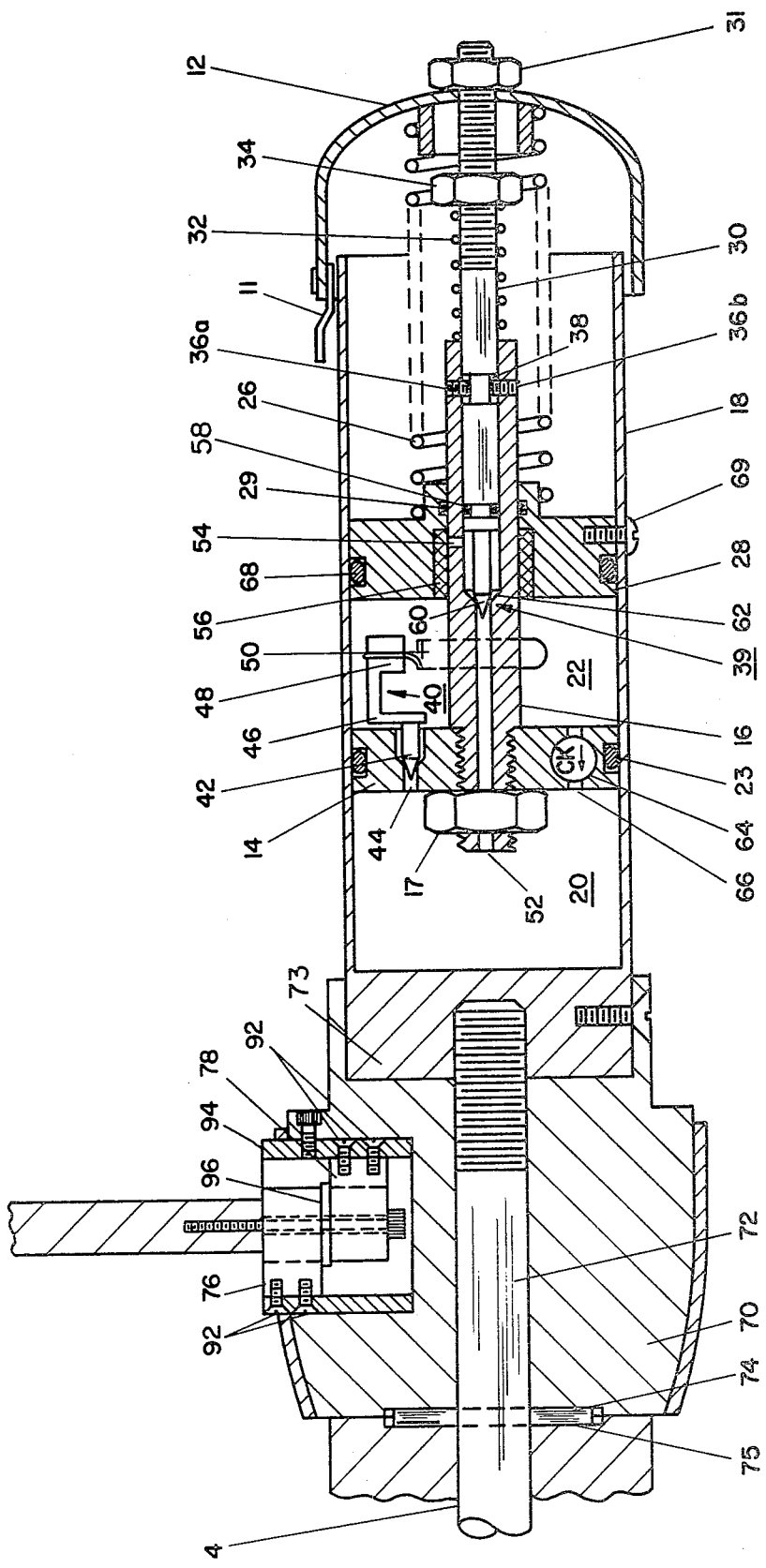
FIG. 4 is a sectional view along line 4—4 of FIG. 3.

A propeller blade, generally indicated diagrammatically at 2 in FIGS. 1 and 2, is connected to a drive shaft 4 for rotation about the longitudinal axis of the shaft 4 and is supported, also, for limited rotational movement about a longitudinal axis 6 of the blade. The axis 6 is positioned non-symmetrically so that the blade area A (FIG. 2) on one side of the pivot line 6 is greater than the area B on the other side of the line. This unbalanced arrangement causes the blade 2 to seek its position of maximum pitch, as illustrated by solid lines in FIG. 1, when the propeller is driven. The position of the propeller blade 2 at minimum pitch is illustrated in broken lines.

In FIG. 1, the shaft 4 rotates in the direction away from the reader as illustrated by the arrow 8. The force produced by resistance to rotation of the area A of the blade is substantially greater than the opposing force produced by rotation of the area B. This unbalance of forces causes the blade to assume maximum pitch. The pivot structure of the blade is connected to a linkage mechanism, diagramatically illustrated at 10. The longitudinal position of an arm 11 extending from the linkage 10 is a function of the pitch of blade 2. The arm 11 is in its leftmost position as viewed in FIG. 1 when the blade 2 has maximum pitch. Force applied to the arm 11 in opposition to the bias force of the propeller permits controlling the pitch of the propeller.

In this embodiment of the invention, the pitch of a boat propeller is controlled by a hydraulic mechanism that automatically changes the pitch of the propeller as a function of the r.p.m. of the propeller and also permits the operator to change the pitch to a new setting by manipulation of the engine throttle.

Figure 5:
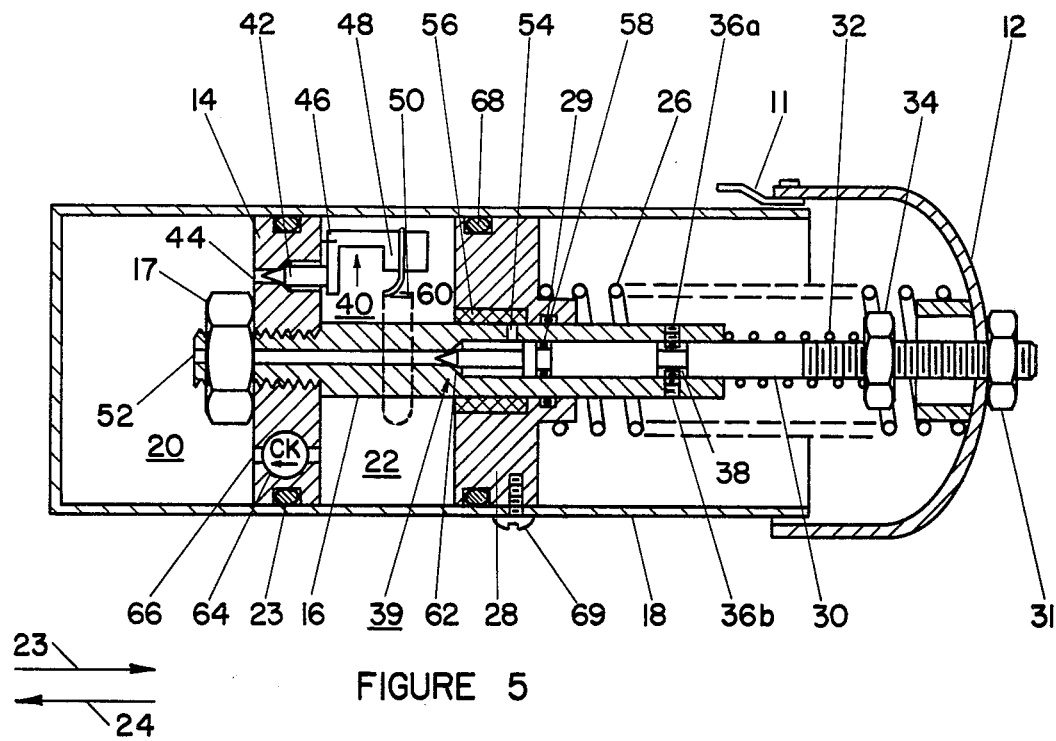
FIG. 5 is a partial diagrammatic view similar to FIG. 4 showing the movable elements of the hydraulic control mechanism in positions corresponding to minimum pitch of the propeller.
Figure 6:
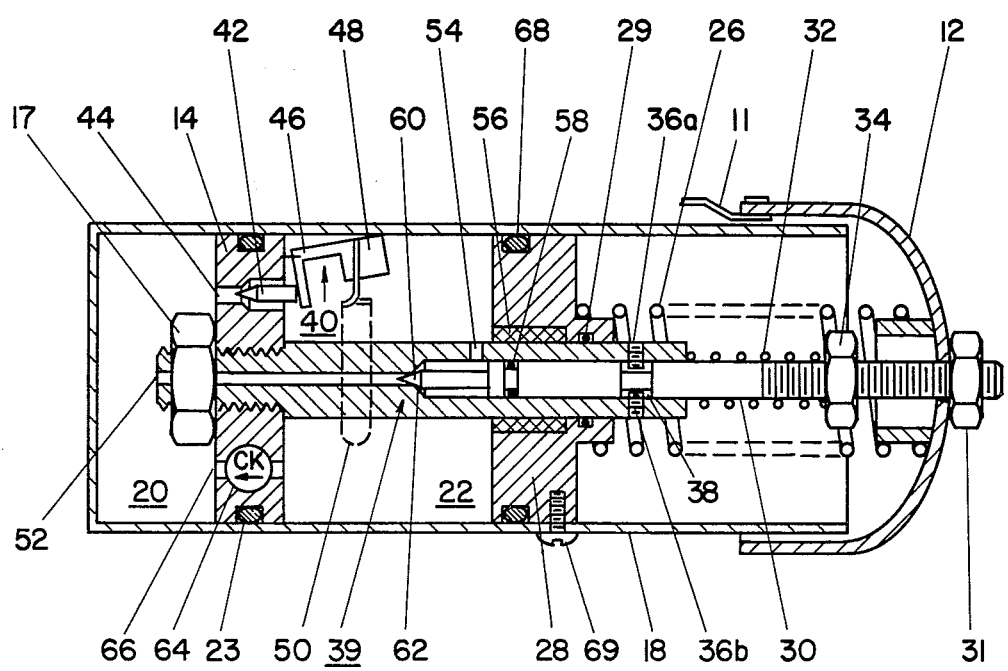
FIG. 6 is a view similar to FIG. 5 but showing the components in the position corresponding to an increased pitch.
Figure 7:
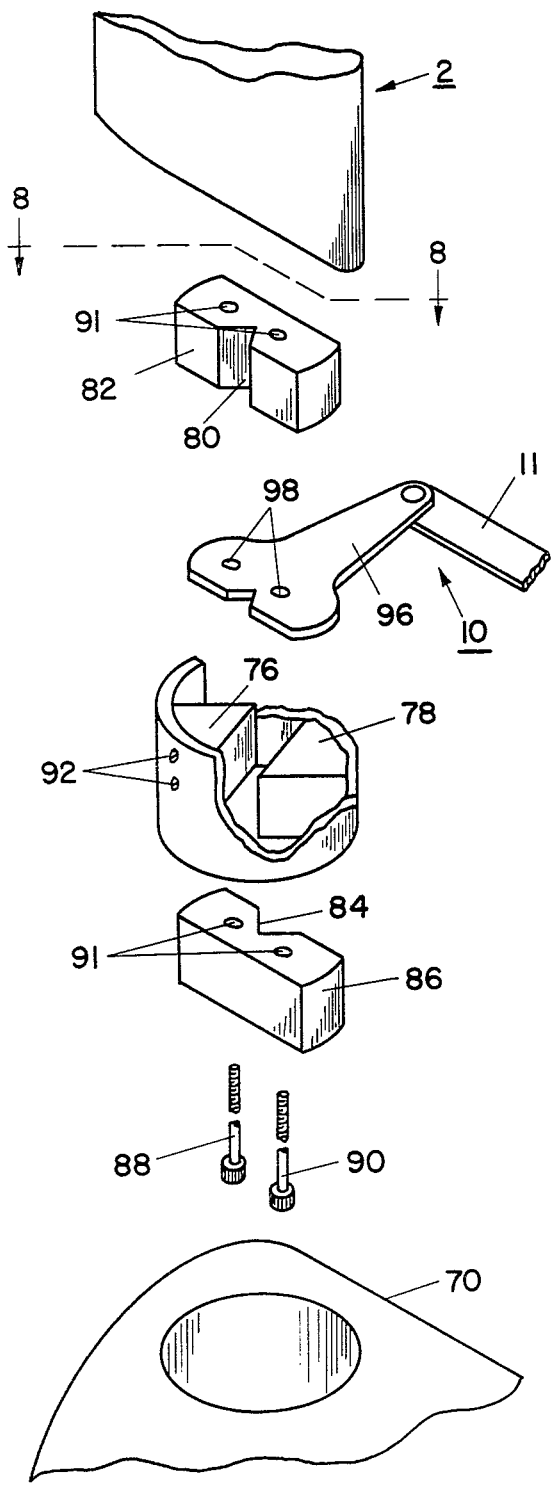
FIG. 7 is an exploded view showing the arrangement of parts supporting and controlling a variable pitch propeller blade.
Figure 8:
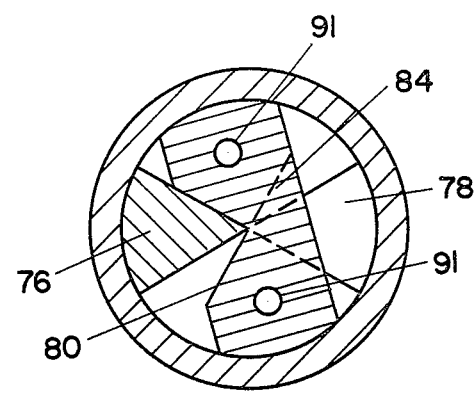
FIG. 8 is a view approximately along the line 8—8 of FIG. 7 showing the pivot control mechanism in the position of maximum pitch.
Figure 9:
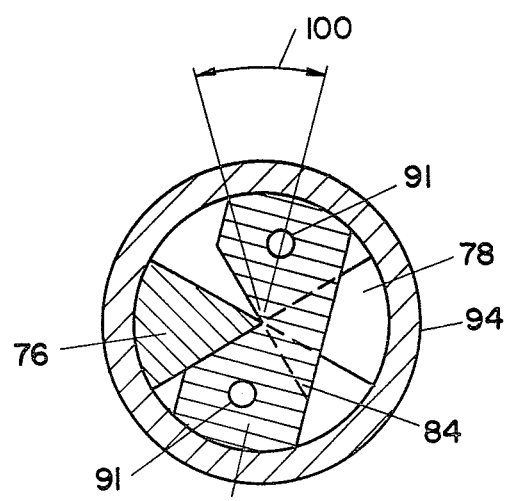
FIG. 9 is a view similar to FIG. 8 showing the mechanism in the position of minimum pitch.

The operation of the control mechanism is illustrated diagrammatically in FIGS. 4, 5 and 6. The arm 11 (one of three) is connected to a tail cap 12 (see also FIG. 3) that is in turn connected to a piston 14 by means of a shaft 16. The piston 14 is secured to the shaft 16 by a nut 17 and is slidably positioned within a cylinder 18. The piston 14 separates a pressure chamber 20 from a reservoir chamber 22, both of which are filled with hydraulic fluid. An O-ring seal prevents leakage around the piston 14. The entire hydraulic mechanism of FIG. 3 is connected to the drive shaft 4 and therefore rotates in unison with the propeller.

When the propeller blade 2 is in its position of minimum pitch, the shaft 16 and piston 14 have moved the maximum distance in the direction of the arrow 23 so that the pressure chamber 20 has its maximum volume and the reservoir chamber 22 has its minimum volume. In FIG. 5 the piston 14 is illustrated in its position corresponding to minimum pitch.

FIG. 6 shows the piston 14 in its position corresponding to a greater pitch. In this condition, the pressure chamber 20 has its minimum volume and the reservoir chamber 22 has its maximum volume.

FIG. 5 represents the conditions at the time the engine is started. A compression spring 26 positioned between the inside of the tail cap 12 and a stationary cylinder head 28 that forms a closed end for the reservoir chamber 22, urges the propeller blade, through arm 11, to its minimum pitch position. The shaft 16 slides through a central opening in the head 28 that is provided with an O-ring seal 29 to prevent leakage of the hydraulic fluid from the reservoir chamber 22.

The shaft 16 includes a valve plunger 30 slidably positioned in the shaft 16 and extending from the shaft to the cap 12 with which it is in threaded engagement. The cap 12, after proper adjustment, is secured in position by a nut 31. A second compression spring 32 is positioned around the plunger 30 between the end of the shaft 16 and a nut 34 threaded onto the plunger 30 and secured in a fixed position.

The movement of the valve plunger 30 within the shaft 16 is limited by a pair of pins 36a and 36b that are secured to the shaft 16 and extend inwardly into an annular groove 38 in the plunger 30. The compression spring 26, urging the cap 12 toward the right relative to the head 28, exerts a force on the piston 14 in the direction of the arrow 23. Therefore, when the propeller is at rest, the tail cap 12 will transmit a tension force to the arm 11 causing the propeller blade to assume its position of minimum pitch.

When the engine is started, the forces on the propeller blades urge them in the direction of maximum pitch. However, for the pitch of the blade to increase, the arm 11 must move toward the left as indicated in FIG. 5. Since movement of the cap 12 in the direction of increased pitch, compresses the spring 32 slightly until further movement of the plunger 30 relative to the shaft 16 is prevented by the pins 36a and 36b or by the closing of a needle valve, generally indicated at 39, any further movement of the cap 12 is prevented because the piston 14 is prevented from moving in the direction of the arrow 24 by the pressure of the hydraulic fluid in the chamber 20. The propeller thus remains substantially at minimum pitch as the throttle is advanced and the propeller r.p.m. increases. Because of the relatively light load imposed by the propeller under these conditions, the vehicle is able to accelerate rapidly.

When the propeller reaches a predetermined r.p.m., a centrifugally-operated valve, generally indicated at 40, opens and allows hydraulic fluid to flow from the pressure chamber 20 into the reservoir chamber 22. The valve 40 includes a plunger 42 that normally closes a port 44 through the piston 14. The plunger is connected to an L-shaped arm 46 hinged to the face of the piston 14 and carrying a weight 48. A tension spring 50 encricles the shaft 16 with its ends connected to the weight 48 and maintains the plunger 42 in closed position. At the predetermined speed of revolution, the centrifugal force produced by the weight 48 overcomes the force of the spring 50 and the weight 48 moves outwardly opening the port 44, as shown in FIG. 6.

When the port 44 is open, the force exerted by the propeller blade 2, which exceeds the opposing force of the spring 26, moves the piston 14 in the direction of the arrow 24, as hydraulic fluid is forced from the pressure chamber 20 into the reservoir chamber 22, until it reaches the position shown in FIG. 6 and the propeller has assumed a greater pitch.

A second passageway between the pressure chamber 20 and the reservoir chamber 22 is provided by a bore 52 extending through the shaft 16 from the pressure chamber 20 to a port 54 that, in the position shown in FIG. 6, communicates with the chamber 22. In the condition of minimum pitch, as shown in FIG. 5, the port 54 is sealed because it is within the head 28 or an attached collar 56. The valve plunger 30 carries an O-ring seal 58 that prevents leakage along the valve plunger 30.

As the shaft 16 moves in the direction of the arrow 24, as the propeller pitch increases, the port 54 is exposed to the chamber 22. The bore 52 thus provides a second path for the flow of hydraulic fluid between the two chambers.

This second path, however, can be closed by the valve plunger 30 which has a tapered nose cone 60 extending with an enlarged portion of the bore 52 and arranged to seat against a conoidal surface 62 of the bore 52 and thus close the path between the port 54 and the chamber 20. The plunger 30 would normally be retained in its open position by the spring 32, but the force generated by the propeller blades and applied to the plunger 30 by the cap 12, in the direction of arrow 24, is generally greater than the compression force of the spring 32 so that the port 54 is normally closed.

The piston 14 is not prevented from moving in the direction of the arrow 23 because of a check valve, diagrammatically illustrated at 64, in a bore 66 through the piston 14. The check valve permits the flow of hydraulic fluid in the direction shown by the arrow, but prevents flow in the opposite direction.

The parameters of the control mechanism will be designed and adjusted in accordance with the particular application and the results that are desired. This particularembodiment is arranged so that, after the boat has attained a speed above its planing speed, and the port 54 is exposed to the reservoir chamber 22, as shown in FIG. 6, the pitch of the propeller can be reset for maximum efficiency at cruising speed by momentarily retarding the throttle. When the throttle is retarded, the speed of the propeller drops abruptly and causes the valve 40 to close the port 44. The force exerted by the propeller on the arm 11 as it is urged toward maximum pitch under drive conditions, is also temporarily reduced so that the force on the cap 12 and the piston 14 in the direction of the arrow 24 is relieved somewhat. The compressive force on the spring 32 is reduced and the valve plunger 30 is moved by the spring 32 in the direction of the arrow 23 opening the port 54 and allowing hydraulic fluid to leak through the bore 52 from the pressure chamber 20 into the reservoir chamber 22. This slight movement of the tail cap 12 by the opening of the port 54 causes a slight, but not significant, reduction in the pitch of the propeller blade. This flow of hydraulic fluid permits the piston 14 to move in the direction of the arrow 24 immediately increasing the pitch of the propeller blade. The increased thrust of the propeller blade resulting from the increased pitch increases the force on the tail cap 12 in the direction of the arrow 24, and, overcoming the force of the spring 32, closes the port 54. The propeller blade is now locked at the increased pitch because both ports 44 and 54 are closed and the piston 14 is prevented from moving further toward the left. The pitch of the propeller blade may be adjusted to an even higher pitch by again momentarily retarding the throttle and repeating the process outlined above. This process may be repeated until the desired relationship between propeller thrust and the engine speed is achieved.

Optimum adjustment of the propeller pitch in accordance with the characteristics of the engine and boat, the load carried by the boat, the cruising speed and water conditions can substantially increase the efficiency and at the same time enable the boat to travel at a given speed wih reduced engine r.p.m.

When the throttle is retarded to its minimum position, or the engine is turned off, the propeller will return to its minimum pitch under the pressure of the spring 26 which urges the piston 14 in the direction of the arrow 23. Movement of the piston 14 in this direction is permitted by the flow of hydraulic fluid through the check valve 64. The check valve permits hydraulic fluid to flow from the reservoir chamber 22 into the pressure chamber 20, but will not permit the flow in the reverse direction.

When the engine is restarted or the throttle advanced from its minimum position, the propeller blade remains at its minimum pitch because the port 44 is closed by the centrifugal valve 40 and the port 54 is closed because it is within either the cylinder head 28 or the collar 56. The propeller blade remains at minimum pitch until the r.p.m. of the propeller is sufficient to cause the valve 40 to open permitting the piston 14 to move in the direction of arrow 24 and allow the pitch to increase. The cylinder head 28 may be provided with an O-ring seal 68, to permit disassembly, and be secured to the cylinder wall 18 by a screw 69.

The construction of the support and pivot control mechanism for the propeller blade 2 is illustrated in FIGS. 3, 4, 7, 8 and 9. A mounting block 70 is provided with a central opening 72 through which the engine drive shaft 4 passes into threaded engagement with the cylinder mounting head 73. A slot 74 receives a drive pin 75 that extends through the shaft 4.

For each of three propeller blades (only one is illustrated), the block 70 serves as a mounting for two V-shaped bearing blocks 76 and 78. The two blocks are positioned facing each other but are displaced along and on opposite sides of the pivot line 6 of the blade 2. The apex of the vee of the block 76 engages the bottom of a V-shaped notch 80 in a pivot block 82. The apex of the vee of the block 78 engages the bottom of a V-shaped notch 84 in a pivot block 86.

The two pivot blocks 82 and 86 are secured in end-to-end relationship, with their V-notches facing opposite directions, by two screws 88 and 90 that pass through openings 91 in the pivot blocks into threaded engagement with the inner end of the blade 2.

The bases of the bearing blocks 76 and 78 are secured by screws 92 to the inside wall of a collar 94 that is secured by any suitable means in the mounting block 70.

The collar 94 and the bearing blocks 76 and 78 thus provide a pivotal support for the blade 2 and transmit the rotary motion to the blade from the drive shaft 4.

The pitch control linkage 10 of the blade 2 includes an arm 96 that is positioned rigidly between the adjacent ends of the bearing blocks 82 and 86 and is provided with two openings 98 through which the screws 88 and 90 pass. Angular movement of the arm 96 rotates the blade along the pivot axis 6 while the two V-assemblies form a sturdy low-friction hinge. The maximum pitch adjustment depends upon the difference between the angle of the notches 80 and 84 and the angles defined on the surfaces of the V-blocks 76 and 78. In this example, the notches 80 and 84 form 90 degree angles and the V-blocks 76 and 78 form 60 degree angles, permitting the pitch to be adjusted over a 30 degree arc, as indicated by the angle 100 in FIG. 9. One hinge support arrangement as described is provided for each blade of the propeller and positioned at equal angles around the drive shaft 4.

The particular control characteristics and parameters to be provided depend upon the characteristics of the engine and the particular circumstances and requirements of use. The dimensions, such as the position of the port 54 along the shaft 16, and the adjustments of the springs 32 and 26, by the positioning of the nut 34 and the tail cap 12 on the shaft 16, will be adjusted to achieve the desired characteristics. The spring 26 must exert sufficient force to return the propeller blades to minimum pitch under rest conditions and the spring 32 must exert enough force to open the needle valve 39 when the throttle is retarded, yet not permit the needle valve to open under load conditions.

The presence of the shaft 16 in the reservoir chamber 22 and not in the pressure chamber 20 can cause a problem if both chambers are completely filled with hydraulic fluid, because the total volume of the two chambers is decreased as the piston moves in the direction of the arrow 24. One solution is to leave a small amount of air space in the reservoir chamber. The compression of this air bubble will compensate for the volume differential. It is important. however, that this air bubble not be transferred into the chamber 20 which would degrade the performance of the unit. One method of preventing such inadvertent transfer of the air bubble is to provide one or more empty cavities, sealed with a flexible membrane, arranged to communicate with the chamber 22 so that depression of the membrane into the cavity will compensate for the volume change. Alternatively, an extension shaft of the same diameter as the shaft 16 may be extended all the way through the chamber 20 so that the total volume of the two chambers is independent of the position of the piston 14.

From the foregoing it will be apparent that the embodiment described is well adapted to attain the ends and objects herein set forth, that it can be economically manufactured and thus meet an important need, and that it is subject to a variety of modifications to best adapt it to meet the conditions of each particular use.

I claim:

1. In a variable pitch control system, the combination comprising
    a propeller having a radially-extending blade,
    means for driving said blade,
    pivot means supporting said blade for angular movement about its radial axis whereby the pitch of said blade is varied, linkage means coupled to said blade and having a predetermined position for each pitch angle of said blade, means responsive to the rotation of said propeller to produce a first force on said linkage means, a cylinder assembly having a pressure chamber and a movable piston sealing said chamber, a reservoir chamber, a channel communicating with said reservoir chamber and said pressure chamber for carrying fluid between said chambers, normally closed valve means arranged to prevent flow through said channel, hydraulic fluid filling said pressure chamber, coupling means connected to said linkage means and said piston and arranged to apply pressure to said fluid in response to said force, control means communicating with said chamber responsive to a predetermined r.p.m. of said propeller to reduce the pressure in said chamber thereby to permit said piston to move in response to said force and said propeller to change pitch, means responsive to a reduction in the r.p.m. of said propeller for opening said normally-closed valve means, and a second valve means arranged to close said channel whenever the pitch of said blade is less than a predetermined angle.

2. In a variable pitch control system, the combination comprising a propeller having a radially-extending blade, means for driving said blade, pivot means supporting said blade for angular movement about its radial axis whereby the pitch of said blade is varied, linkage means coupled to said blade and having a predetermined position for each pitch angle of said blade, means responsive to the rotation of said propeller to produce a first force on said linkage means, a cylinder assembly having a pressure chamber and a movable piston sealing said chamber, hydraulic fluid filling said pressure chamber, coupling means connected to said linkage means and said piston and arranged to apply pressure to said fluid in response to said force, control means communicating with said chamber responsive to a predetermined r.p.m. of said propeller to reduce the pressure in said chamber thereby to permit said piston to move in response to said force and said propeller to change pitch, said drive means including a frame, said pivot means including a pair of oppositely-disposed longitudinally-displaced pivot blocks each having a V-notch, a pair of oppositely-disposed longitudinally-displaced V-blocks each having a pair of angular faces defining an angle less than the angle of one of said V-notches, means supporting said V-blocks and said pivot blocks with the apex of each of said V-blocks in engagement with the bottom of one of said V-notches, and first and second mounting means coupled respectively to said frame and to said blade, said pair of pivot blocks being secured to one of said mounting means, said pair of V-blocks being secured to the other of said mounting means, the apex of each of said pivot blocks and the bottom of each of said V-notches being positioned along said radial axis.

3. In a variable pitch propeller, apparatus for supporting a propeller blade for rotation about a radial axis comprising a drive means coupled to said propeller, a frame supporting said propeller, pivot means including a pair of oppositely-disposed longitudinally-displaced pivot blocks each having a V-notch, a pair of oppositely-disposed longitudinally displaced V-blocks each having a pair of angular faces defining an angle less than the angle of one of said V-notches, means supporting said V-blocks and said pivot blocks with the apex of each of said V-blocks in engagement with the bottom of one of said V-notches, first and second mounting means coupled respectively to said frame and to said blade, said pair of pivot blocks being secured to one of said mounting means, said pair of V-blocks being secured to the other of said mounting means, the apex of each of said pivot blocks and the bottom of each of said V-notches being positioned along said radial axis.

4. In apparatus for controlling the pitch of a propeller, the combination comprising a blade, means supporting said blade for limited rotation about a radial axis, said axis being positioned non-symmetrically with respect to the surface areas of said blade on opposite sides of said axis and arranged when said propeller is under load to produce a force urging said blade toward maximum pitch, a pressure chamber having a movable piston, hydraulic fluid filling said chamber, connecting means responsive to the angle of pitch of said blade about said axis and coupled to said piston and arranged to apply pressure to said fluid, pressure relief means communicating with said fluid in said pressure chamber including first and second valve means, said first valve means being arranged to close said pressure relief means whenever the pitch of said blade about said axis is less than a predetermined angle, said second valve means being normally closed and connected in series with said first valve means, and means responsive to a reduction in said force to open said second valve means.

* * * * *